United States Patent
Osibamowo et al.

(10) Patent No.: US 6,948,883 B2
(45) Date of Patent: Sep. 27, 2005

(54) SEALING THE JUNCTION REGION WHERE A LATERAL PIPE AND A MAIN PIPE MEET

(75) Inventors: Olaleke Osibamowo, London (GB); Andrew Chettle, Derbyshire (GB)

(73) Assignee: Project Building Co. Limited, London (GB)

(*) Notice: Subject to any disclaimer, the term of this patent is extended or adjusted under 35 U.S.C. 154(b) by 187 days.

(21) Appl. No.: 10/367,445

(22) Filed: Feb. 14, 2003

(65) Prior Publication Data

US 2004/0161301 A1 Aug. 19, 2004

(51) Int. Cl.[7] .................. F16L 55/16; B29C 63/36
(52) U.S. Cl. .............. 405/184.2; 405/146; 405/150.1; 138/93; 138/98; 156/287; 156/294
(58) Field of Search .............. 405/184.2, 146, 405/184.1, 150.1; 138/93, 97–99; 156/94, 156, 287, 294

(56) References Cited

U.S. PATENT DOCUMENTS

| | | | |
|---|---|---|---|
| 4,434,115 A | 2/1984 | Chick | |
| 5,454,401 A * | 10/1995 | Kamiyama et al. | 138/97 |
| 5,927,341 A | 7/1999 | Taylor | |
| 5,950,682 A | 9/1999 | Kiest, Jr. | |
| 5,971,032 A | 10/1999 | Ward | |
| 5,975,878 A * | 11/1999 | Wood et al. | 425/503 |
| 6,001,212 A * | 12/1999 | Polivka et al. | 156/287 |
| 6,021,815 A | 2/2000 | Kiest, Jr. et al. | |
| 6,039,079 A | 3/2000 | Kiest, Jr. | |
| 6,068,725 A * | 5/2000 | Tweedie et al. | 156/287 |
| 6,082,411 A | 7/2000 | Ward | |
| 6,085,794 A * | 7/2000 | Kamiyama et al. | 156/287 |
| 6,105,619 A | 8/2000 | Kiest, Jr. | |
| 6,171,435 B1 * | 1/2001 | Stoves et al. | 138/97 |
| 6,206,049 B1 * | 3/2001 | Ward | 138/98 |
| 6,688,337 B2 * | 2/2004 | Ward | 138/98 |
| 6,695,013 B2 * | 2/2004 | Warren | 138/98 |

FOREIGN PATENT DOCUMENTS

| | | | | |
|---|---|---|---|---|
| GB | 2041147 | * | 9/1980 | |
| JP | 01317745 | * | 12/1989 | 138/99 |

* cited by examiner

*Primary Examiner*—Jong-Suk (James) Lee
(74) *Attorney, Agent, or Firm*—Smith-Hill and Bedell

(57) ABSTRACT

A lining for sealing the junction region where a lateral pipe and a main pipe meet. It has a two-portion structure including a main portion for lining a portion of the main pipe and a lateral portion of resin absorbent material for lining a portion of the lateral pipe. The main portion is sized for application to the full circumference of a main pipe on both sides of the junction and has an aperture for alignment with the opening of the lateral pipe. The lateral portion is connected to the main portion where it defines said opening and is gathered on a first side of the main portion.

38 Claims, 8 Drawing Sheets

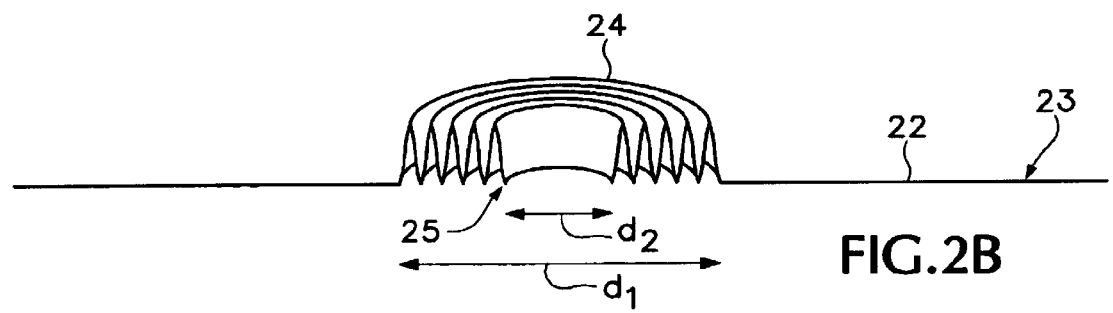
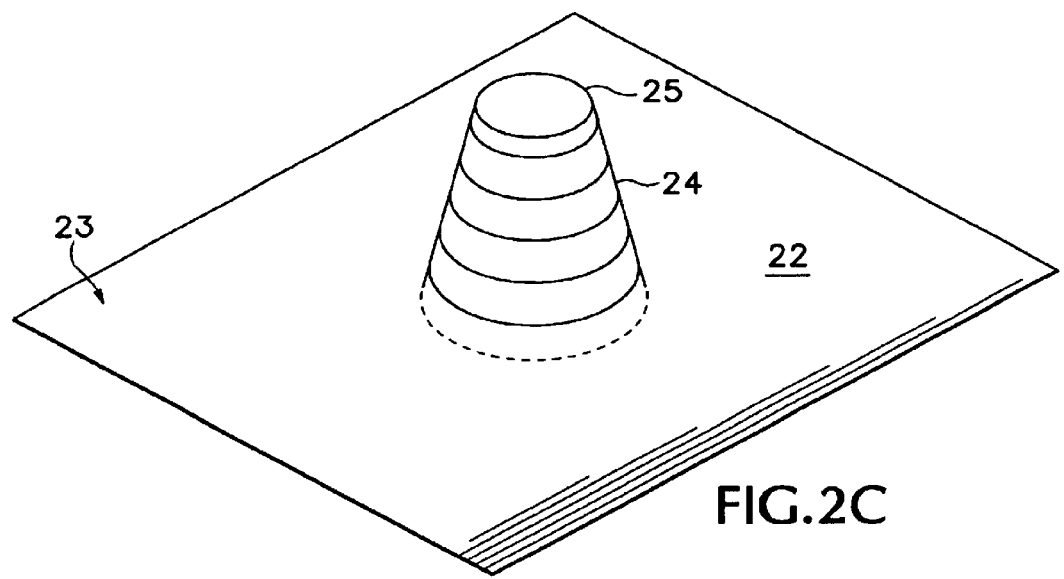

SEALING THE JUNCTION REGION WHERE A LATERAL PIPE AND A MAIN PIPE MEET

TECHNICAL FIELD

Embodiments of the present invention relate sealing the junction region where a lateral pipe and a main pipe meet.

BACKGROUND OF THE INVENTION

Underground pipes can break and crack with ground movement over time. Where a pipe breaks, ground water enters the pipe. If the pipe is a sewer this ground water will mix with the sewage and ultimately be treated at the water treatment works. This is uneconomic. The fluid carried by a damaged pipe may also leak into the ground surrounding the pipe and polluting the ground water.

It is undesirable to completely replace damaged pipes as this requires significant excavation, which is difficult when pipes underlie man-made structures such as roads and buildings.

It is therefore desirable to repair or restore the pipes while they are in situ. This can be achieved by lining the pipe.

Lining a main sewer has been achieved by coating the interior of the main pipe with a fabric lining impregnated with resin and then curing the resin. Contact is made between the fabric and the wall of the main pipe by either directly inflating a 'sock' of fabric impregnated with resin or by inflating a balloon that supports a tube of fabric impregnated with resin. The resin cures and the fabric lining forms a hard liner. A robotic cutter is then used to cut holes in the main liner where lateral pipes join the main pipe.

This is, however, only a partial solution. Damage to the laterals themselves may significantly contribute to ingress to or egress from the sewer system.

The laterals are generally accessible only from one clean-out (man-hole). The laterals are lined by shooting a lining into the lateral either from the man hole or from inside the main sewer. The shooting process uses a sock-like balloon attached to a vessel at its opening. The balloon is turned inside-out (inverted) and extends into the interior of the vessel in its primed state. When inflated by fluid provided to the vessel the sock-like balloon extends from the vessel and presses a tubular lining against the wall of the lateral pipe. The tubular lining is made of fabric impregnated with resin, which cures to form a liner. The balloon can then be deflated and removed.

This procedure creates an area at the junction between a lined main pipe and a lined lateral pipe which may be unsealed or poorly sealed.

It is therefore desirable to tie the lining of the main pipe and the lining of the lateral pipe together.

One way of trying to achieve this to insert a resin fabric tube from the main and shoot (invert) the tube 10–30 m up the lateral pipe. The tube terminates on the main with a flared end like a flange or top-hat bonded to the main sewer lining. The claimed benefit of this procedure is that in a single process the lateral pipe and the junction between the main and lateral are lined. However, this process is not always effective.

It is an object of the present invention to provide an afternative mechanism for lining a junction.

BRIEF SUMMARY OF THE INVENTION

According to an embodiment of the invention there is provided an apparatus for lining a junction where a lateral pipe meets a main pipe, comprising: a first support for supporting a main lining, for lining a portion of the main line; a second support for supporting a lateral lining, for lining a portion of the lateral line; a first drive mechanism for moving the first support so that a supported main lining lines a portion of the wall of the main pipe; and a second drive mechanism for moving the second support so that a supported lateral lines a portion of the wall of the lateral pipe.

According to another embodiment of the invention there is provided a method of lining a junction where a lateral pipe meets a main pipe, using a mechanism including a first support that supports a main lining, for lining a portion of the main line, and a second support that supports a lateral lining, for lining a portion of the lateral line, comprising the steps of: moving the first support so that the main lining lines a portion of the wall of the main pipe; and moving the second support so that the lateral lining lines a portion of the wall of the lateral pipe.

According to another embodiment there is provided a lining for sealing the junction region where a lateral pipe and a main pipe meet, comprising a two-portion structure including a main portion for lining a portion of the main pipe and a lateral portion of resin absorbent material for lining a portion of the lateral pipe, wherein the main portion is sized for application to the full circumference of a main pipe on both sides of the junction and has an aperture for alignment with the opening of the lateral pipe and wherein the lateral portion is connected to the main portion where it defines said opening and is gathered on a first side of the main portion.

According to another embodiment there is provided a lining for sealing the junction region where a lateral pipe and a main pipe meet, comprising a two-portion structure including a main portion for lining a portion of the main pipe and a lateral portion of resin absorbent material for lining a portion of the lateral pipe, wherein the main portion is sized for application to the full circumference of a main pipe on both sides of the junction and has an aperture for alignment with the opening of the lateral pipe and wherein the lateral portion has a first end that is connected to the main portion where it defines said opening and a second unconnected end and is of tubular or frusto-conical shape with multiple circumscribing parallel fault lines about which the lateral portion may be multiply folded.

According to a further embodiment there is provided a method of sealing the junction region where a lateral pipe and a main pipe meet, using a two-portion lining including a main portion for lining a portion of the main pipe and a lateral portion of resin absorbent material for lining a portion of the lateral pipe, wherein the main portion is sized for application to the full circumference of a main pipe on both sides of the junction and has an aperture for alignment with the opening of the lateral pipe and wherein the lateral portion is connected to the main portion where it defines said opening comprising the step of: gathering the lateral portion on a first side of the main portion.

BRIEF DESCRIPTION OF THE DRAWINGS

For a better understanding of the present invention reference will now be made by way of example only to the accompanying drawings in which:

FIGS. 2A and 2B illustrate one type of lining in a gathered configuration;

FIG. 2C illustrates the lining of FIGS. 2A and 2B in a sealing configuration;

DETAILED DESCRIPTION OF EMBODIMENTS OF THE INVENTION

Figure 1:
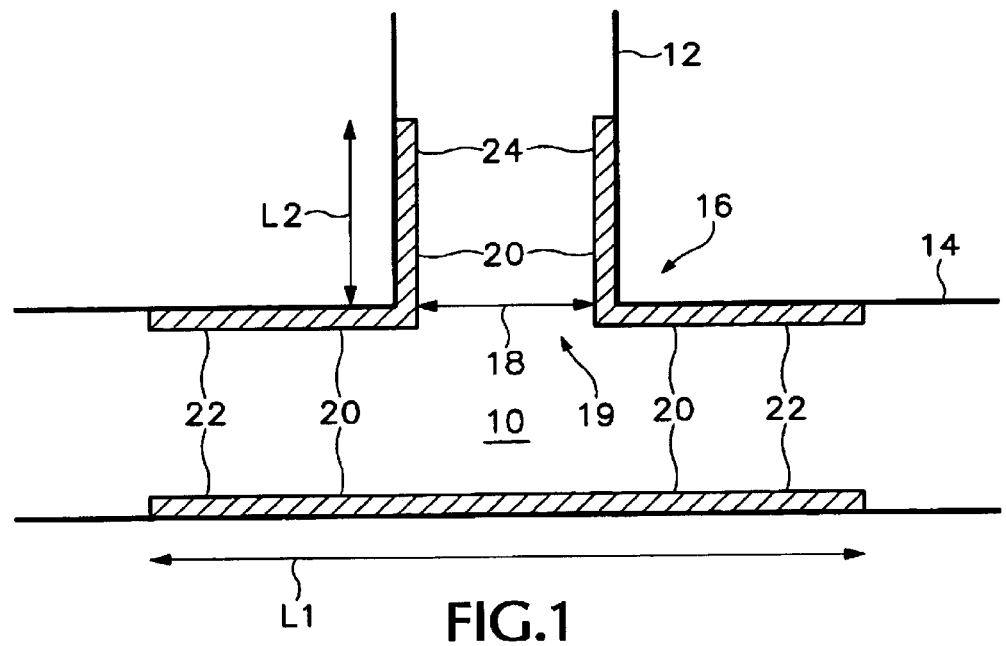
FIG. 1 illustrates a sewer junction where a lateral pipe joins a main pipe.

FIG. 1 illustrates a sewer 10. A lateral pipe 12 joins a main pipe 14 at a junction region 16. The junction region 16 has been sealed using a hard liner formed from by curing in place a lining 20 impregnated with resin. The lining 20 has a two portion structure of resin absorbent material. A main portion 22 lines a portion of the main pipe 14 and a lateral portion 24 lines a portion of the lateral pipe 12.

The main portion 22 is applied to the full circumference of the interior surface of the main pipe 14 on both sides of the junction. It consequently forms a tube (liner) within a tube (main pipe) after it has cured. The lining 20 has an aperture 18 aligned with the opening 19 of the lateral pipe 12. The main portion 22 has a length L1 from end to end (L1 is typically 6 m).

The lateral portion 24 is applied to substantially the full circumference of the interior surface of the lateral pipe in the vicinity of the junction. The lateral portion is short; typically it has a length L2 between 1 and 2 m.

FIG. 1 illustrates a "T" junction. Embodiments of the invention are also applicable when the angle between lateral pipe the main pipe where they meet is other than 90 degrees.

Figure 2A:
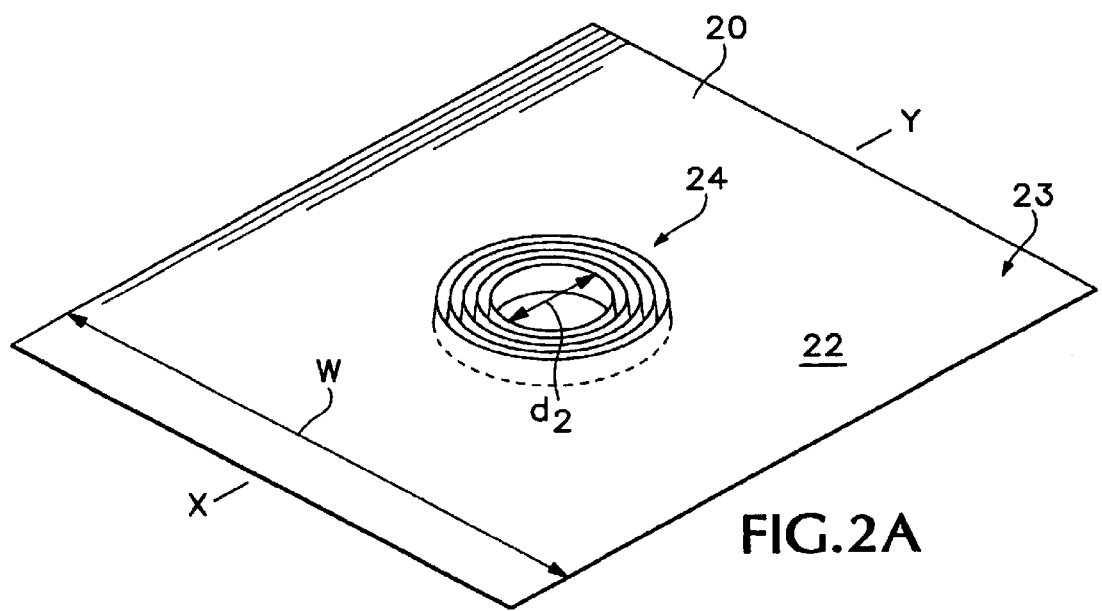

FIGS. 2A, 2B and 2C illustrate one type of two-portion lining 20. The lateral portion is extendible, during application, from a gathered configuration (FIGS. 2A & 2B) to a sealing configuration (FIG. 2C). FIG. 2A illustrates the lining 20 in a gathered configuration from a perspective view. FIG. 2B illustrates the lining 20 in a gathered configuration in cross-section about the line X-Y of FIG. 2A. FIG. 2C illustrates the lining 20 in a sealing configuration from a perspective view.

The lining 20 is made from fibrous material such as felt or polyester. It is flexible, absorbs resin and is tailored to form two connected portions—a lateral portion 24 and a main portion 22.

In this example, the main portion 22 is a rectangular flat sheet that forms a tube in use. The width W of sheet is greater than the inner circumference of the main pipe 14. The length of the sheet is L1.

The lateral portion 24 is hollow frusto-conical in shape as can be clearly seen in FIG. 2C. It tapers from a diameter $d_1$ where it is connected to the main portion 22 to a diameter d2 at a free-end. The diameter $d_1$ is substantially the same size as the diameter of the opening 19 of the lateral pipe 12.

In the gathered configuration the lateral portion is gathered on the 'exterior' side 23 of the main portion 22.

In this example, the lateral portion is originally in the sealing configuration. It is placed in the gathered configuration by repeatedly folding the lateral portion. The lateral portion is first inwardly folded after a length l from where the lateral portion joins the main portion. The tubular lateral portion is thereby turned inside-out. The lateral portion is then folded outwardly after a length l from the last fold which is approximately level with where the lateral portion and the main portion join. This process of inward and outward folding is repeated until the lateral portion has been collapsed (concertinaed) to a height of l above the 'exterior' surface of the main portion. The collapsed, compactly folded lateral portion is self overlapping and has a corrugated or serpentine shape in cross-section.

Figure 3A:
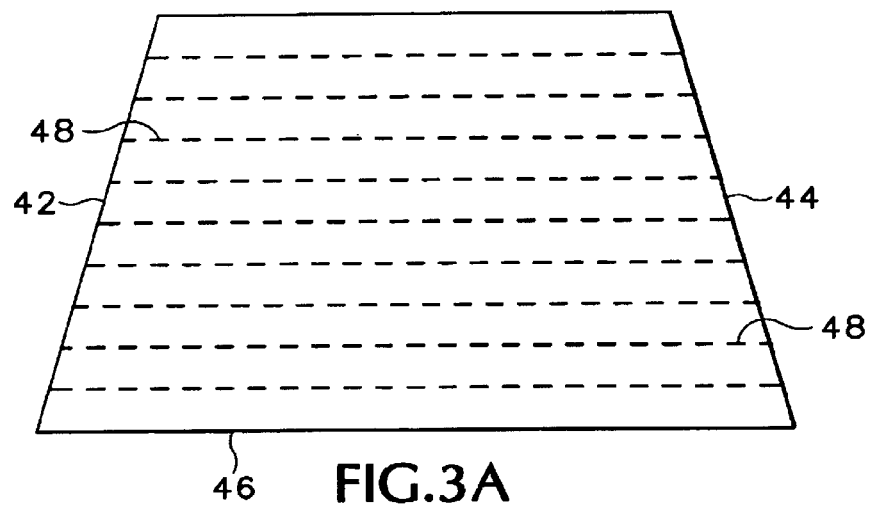
FIG. 3A illustrates tailored fabric for creating a lateral portion of the lining.
Figure 3B:
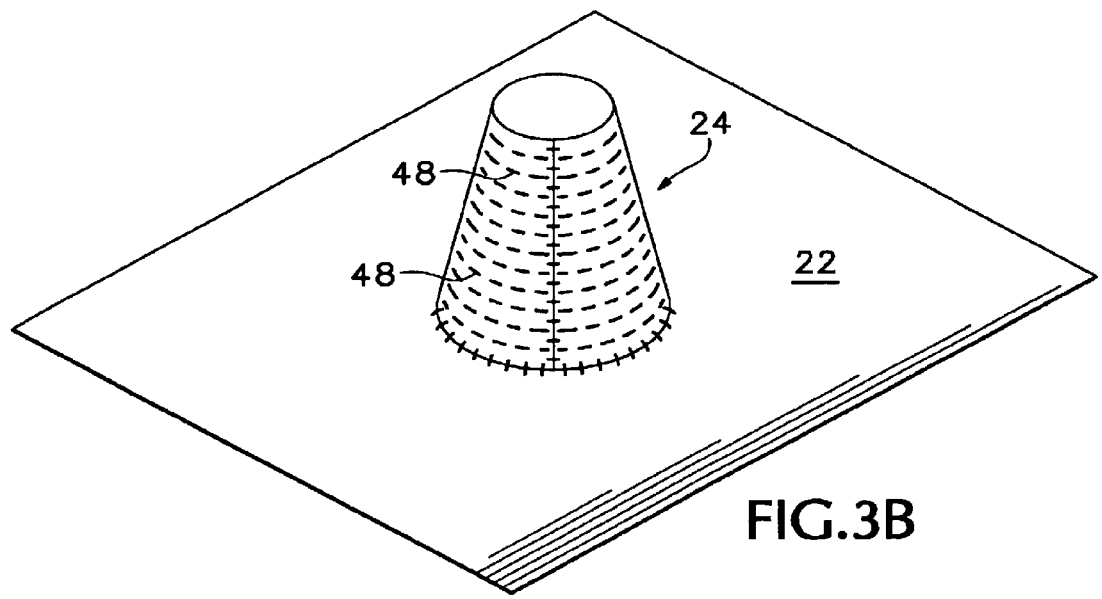
FIG. 3B illustrates a lateral portion made from the net illustrated in FIG. 3A.

The lateral portion may be made from one piece of tailored fabric as illustrated in FIG. 3A. For example, it may be made from a sheet of material having the shape of an isosceles trapezium 40, where the non-parallel edges 42, 44 are stitched together to form the hollow frusto-conical lateral portion 24 illustrated in FIG. 3B. The lateral portion 24 is attached along the longer of its parallel sides 46 to the main portion 22 so that the longer of the parallel sides circumscribes the aperture 18. It may be attached by any suitable method, stitching is one example. The one-piece lateral portion may have faults lines 48 (illustrated by dashed lines in FIGS. 3A and 3B) introduced into the fabric to that it can be multiply folded into its gathered configuration more easily. The fault lines are parallel and each circumscribes the frusto-cone.

Figure 4:
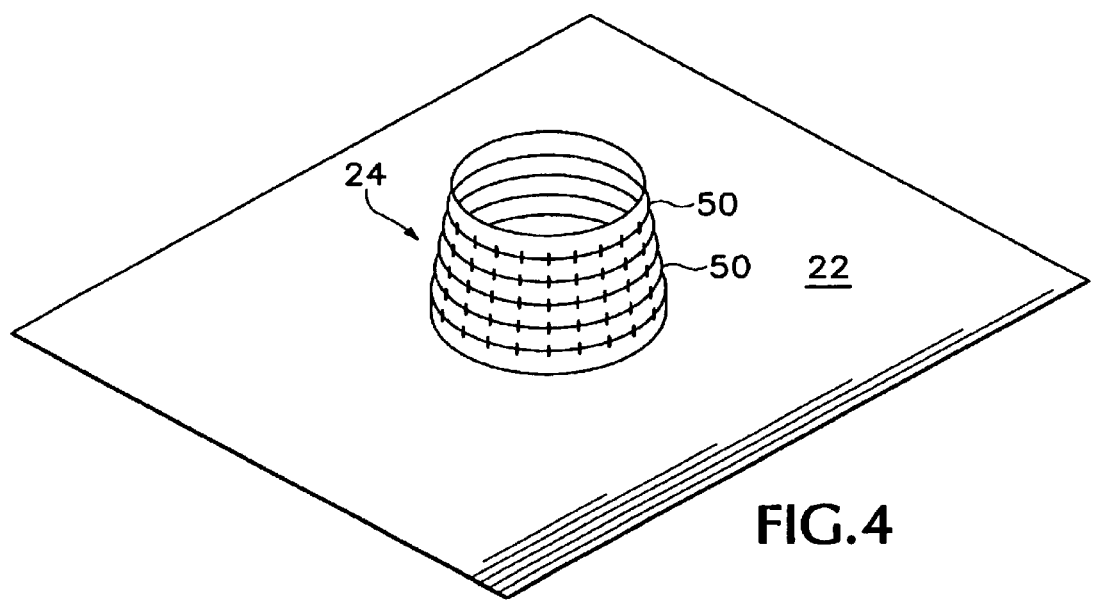
FIG. 4 illustrates an alternative lateral portion made from multiple pieces of connected tubular strips.

The lateral portion 24 may alternatively be made from multiple pieces of connected tubular strips 50. Such a lateral portion 24 is illustrated in the sealing configuration in FIG. 4. There may be four to six consecutive tubular strips 50, each approximately 1"–3" wide and with tapering diameters from 4" to 3" or from 6" to 5" depending upon the application. Each tubular strip 50 can be attached to the adjacent tubular strip by stitching. The stitched joint and tapered profile allows the easy concertinaing of the lateral portion into a single ring when compressed into the gathered configuration.

Figure 5A:
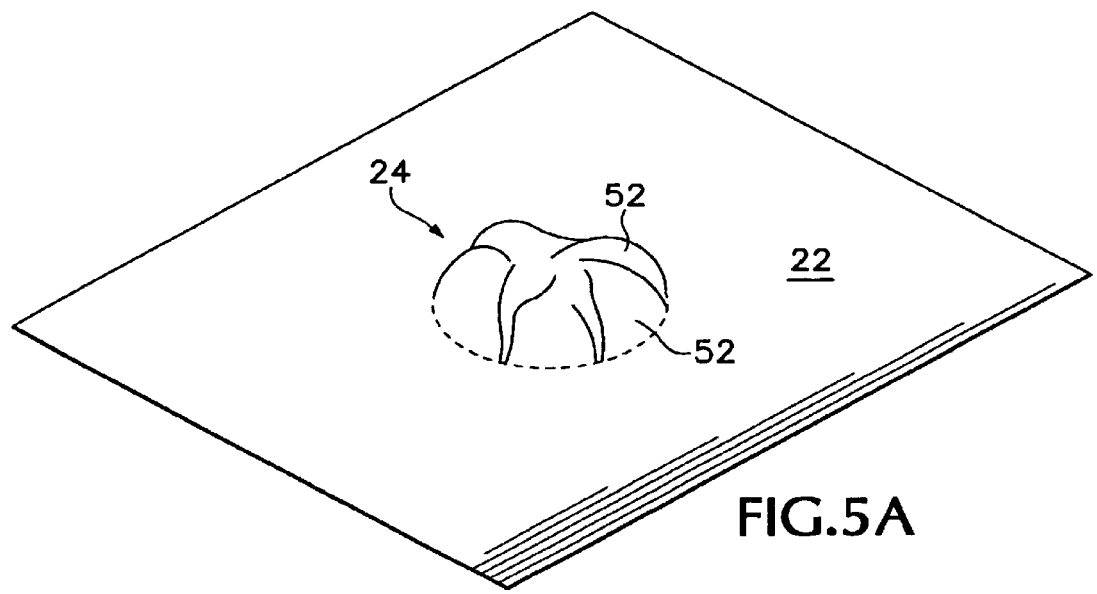
FIGS. 5A and 5B illustrate another lining.
Figure 5B:
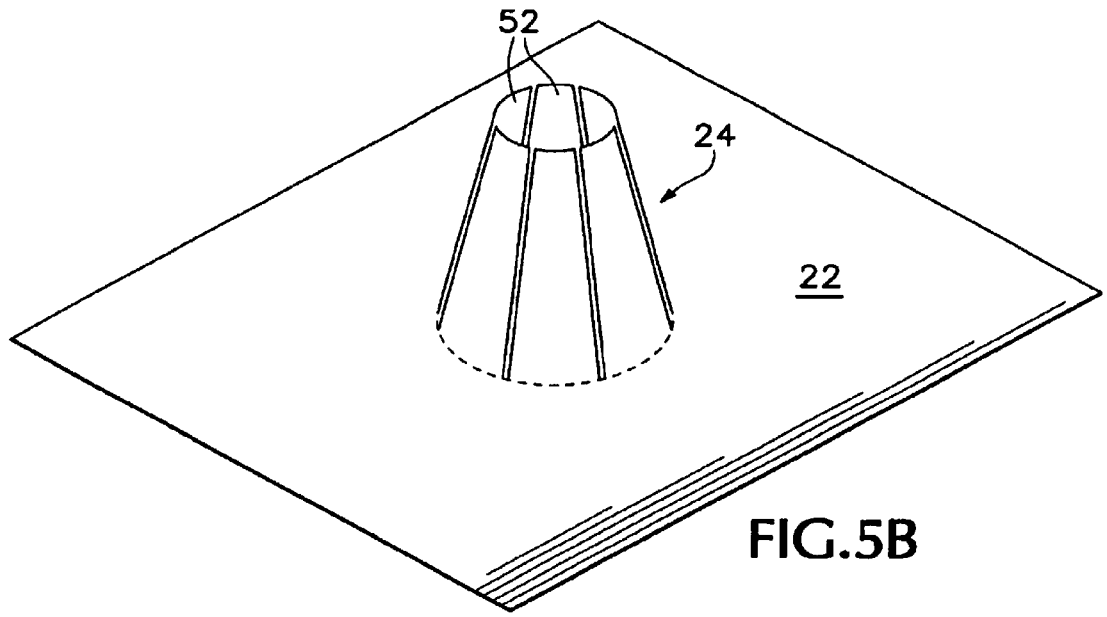
Figure 6A:
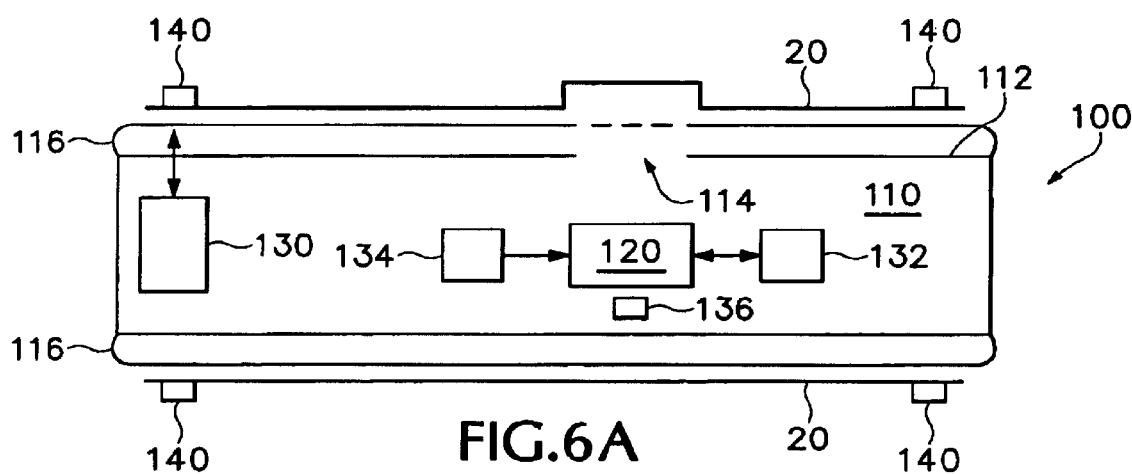
FIGS. 6A, 6B, 6C and 6D illustrate the operation of a packer for applying a lining to a junction.
Figure 6B:
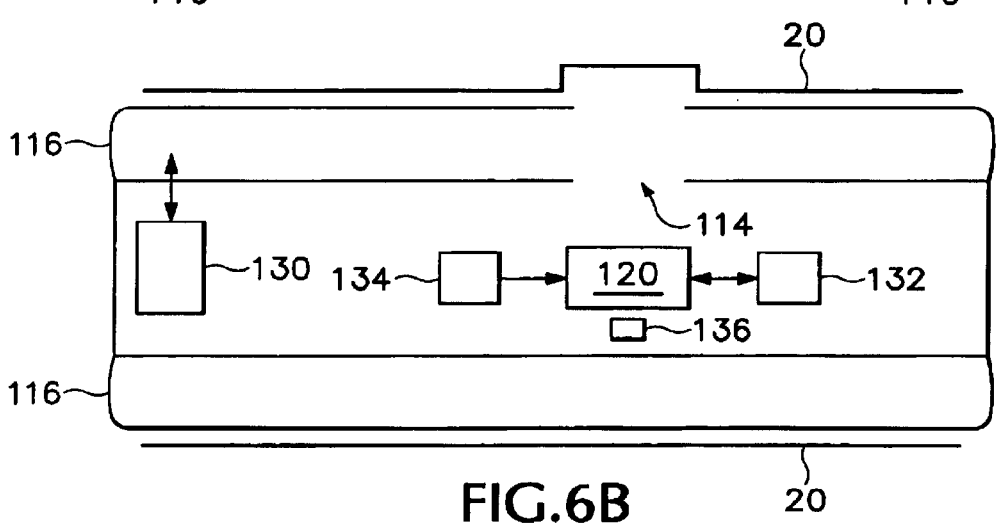
Figure 6C:
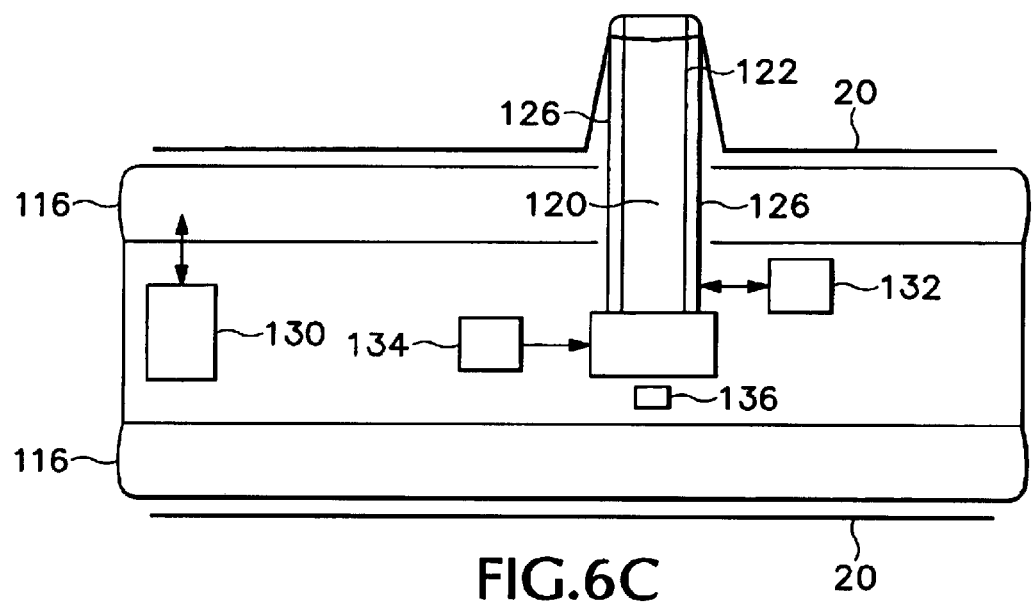
Figure 6D:
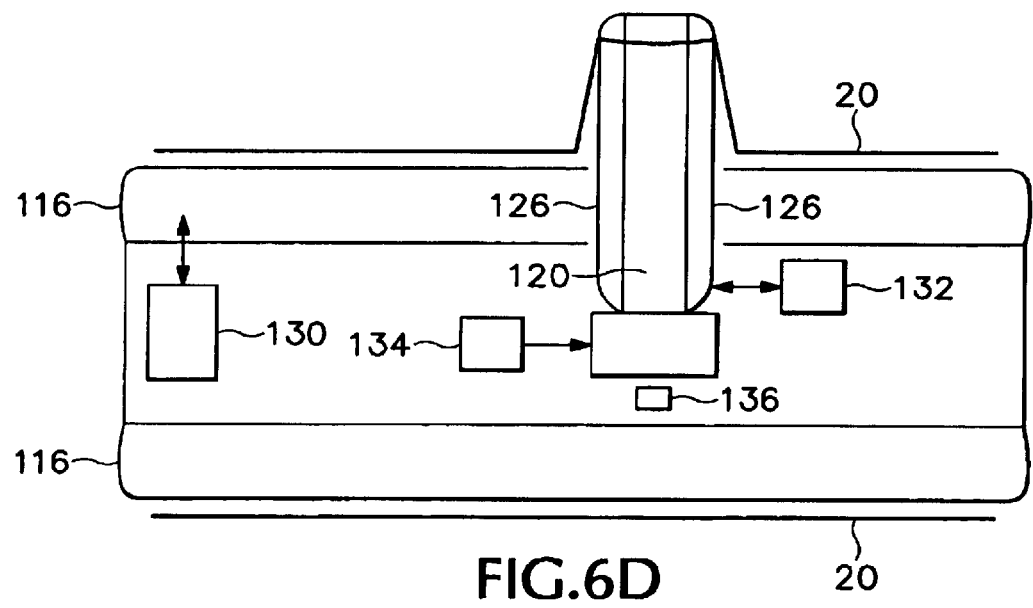

FIGS. 5A and 5B illustrate another type of lining 20, in the sealing configuration illustrated in FIG. 5B, multiple strips 52 of fabric form the lateral portion 24. The strips of fabric are attached to the first portion around the aperture 18 and each extends away from the main portion 22 to a free-end in the sealing configuration. In the gathered configuration the strips are placed in a self-overlapping arrangement overlying the aperture 18 in the main portion 22. The multiple strips 52 may be formed by shredding a tube of fabric. The tube may have a hollow frusto-conical shape.

FIGS. 6A, 6B, 6C and 6D illustrate a packer 100 that has two parts: a main part 110 and a lateral part 120.

The main part 110 has a tubular steel inner body 112 with an aperture 114. A tubular expandable main balloon 116 extends over the curved surfaces of the tubular steel inner body 112.

The lateral part 120 has a tubular steel inner body 122. A tubular expandable lateral balloon 126 extends over the curved surfaces of the tubular steel inner body 122. The lateral part has a retracted position (FIGS. 6A and 6B) in which it is housed entirely within the main part 110 and an extended position (FIGS. 6C and 6D) in which it has been extended through the aperture 114 in the main part 110. This movement of the lateral part from the retracted position to the extended position pushes the lateral portion 24 of an attached lining 20 from a gathered configuration to a sealing configuration.

A main air supply 130 is arranged to expand the main part 110 by inflating the expandable main balloon 116 and operable to collapse the main part 110 by deflating the expandable main balloon 116.

A lateral air supply 132, which is operable independently of the main air supply is arranged to expand the lateral part 120 by inflating the expandable lateral balloon 126 and operable to collapse the lateral part 120 by deflating the expandable lateral balloon 126.

A motor 134 is operable to extend the lateral part 120 from its retracted position to its extended position and operable to retract the lateral part 120 from its extended position to it retracted position.

A camera 136 for correctly locating and positioning the packer 100 may be housed within the main part 110 looking through the aperture 114

The process of lining a junction 16 will now be described. This process is applicable whether or not the main pipe 14 and the lateral pipe 12 have previously been lined.

The packer 100 is placed in its starting state. The lateral part 120 is retracted and collapsed and the main part 110 is collapsed.

The two-part lining 20 is impregnated with cure-in-place resin. The resin may be an ambient cure type which cures with the passage of time or a temperature cured/initiated resin. Some examples of suitable resins are epoxy resins and fibreglass type liquid resin. After curing the resin impregnated fabric of the lining 20 becomes a structural type plastic and forms a 2–4 mm thick liner within the pipes 12, 14.

Lining 20 is placed into gathered configuration either before or after resin impregnation.

The main portion 22 of the lining 20 is wrapped around the tubular expandable main balloon 116 so that its edges overlap. It is held in place by bands 140.

The packer 100 with attached two-part lining 20 is manoeuvred into position using the camera.

The main part 110 of the packer 100 is expanded which pushes the main portion 22 of the lining 20 against the wall of the main pipe 14.

The lateral part 120 is extended while the main part 110 is expanded. The gathered lateral portion 24 of the lining 20 is pushed by the extending lateral part 120. The configuration of the lateral portion 24 of the lining 20 is thus changed from the gathered configuration to the sealing configuration.

The lateral part 120, which is now extended, is expanded. This pushes the lateral portion 24 of the lining 20 against the lateral pipe 12 in the vicinity of the junction 16.

The lining is then cured, for example, by the passage of time (a few hours). Then the lateral part is firstly collapsed and then retracted into the main part and the main part is then collapsed.

The process pushes the lining 20 into the lateral pipe 12. There is no shooting of an inverted lining. The lateral portion 24 in the gathered configuration is not-inverted within the main portion 22.

Although the main portion 22 of the lining has been described as a flat sheet it may be pre-formed into a tube.

Although the main portion 22 has been described as made of resin-absorbent fabric, it may alternatively be form from a solid ductile sheet steel or plastic.

The main balloon may be inflated asymmetrically i.e. a lower portion of the balloon expands more than an upper portion. This may be achieved by dividing the main balloon 116 into separate air tight compartments and separately inflating the compartments or by making the balloon asymmetric in it expandability, so that a lower portion expands more easily than an upper portion. The asymmetric inflation of the main balloon results in a greater portion of the lateral part 120 entering the lateral line 12.

Figure 7A:
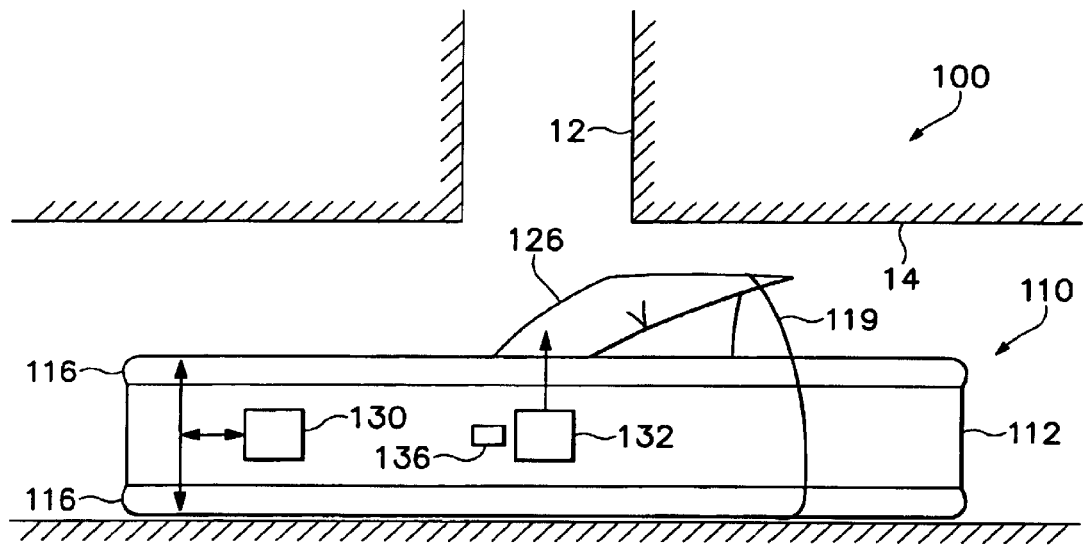
FIGS. 7A, 7B and 7C illustrate the operation of an alternative packer for applying a lining or linings to a junction.
Figure 7B:
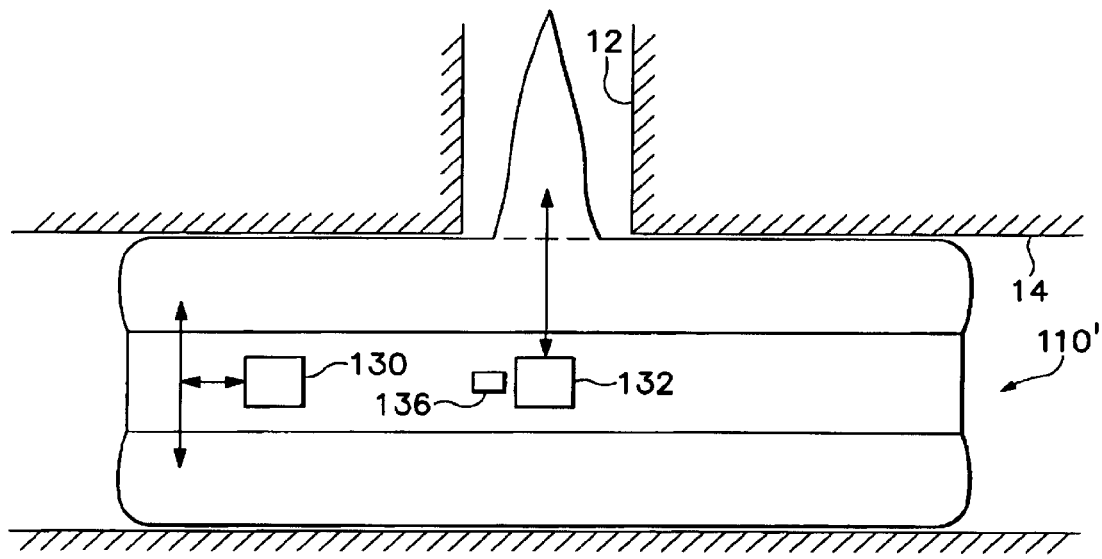
Figure 7C:
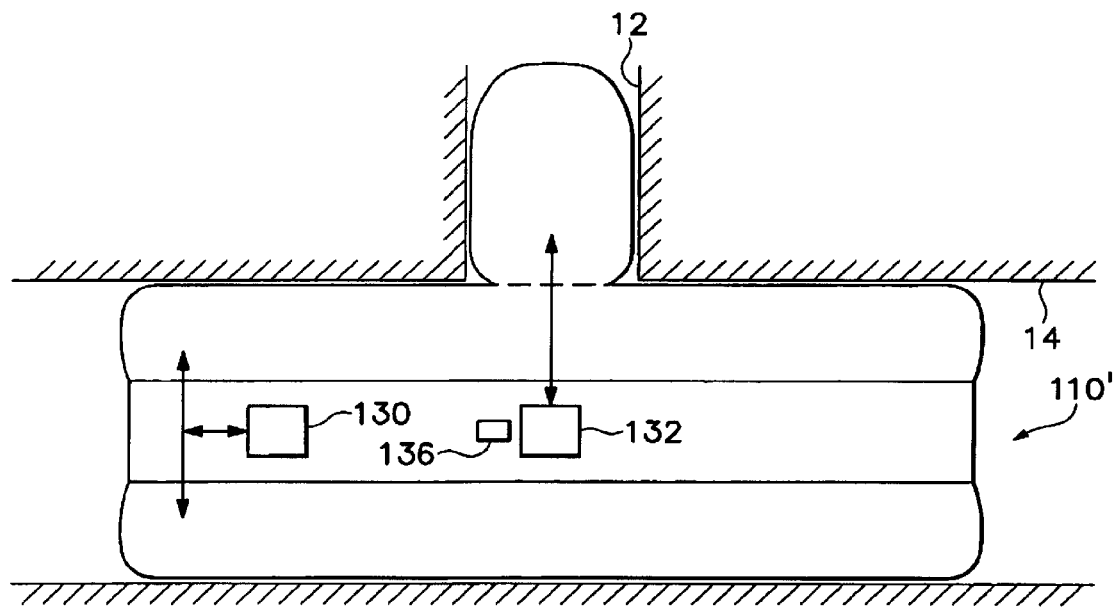

FIGS. 7A, 7B and 7C illustrate an alternative packer 100. The packer 100 has a main part 110 comprising a tubular steel inner body 112 and a tubular expandable main balloon 116 extending over the curved surfaces of the tubular steel inner body 112. It also has an expandable lateral balloon 126 separate to the main balloon 116 but connected to the surface of the main balloon 116.

A one-piece, two-portion lining 20 may be supported by the main and lateral balloons. This lining has a main portion 22 and a lateral portion 24.

The lateral balloon 126 is made from a resiliently deformable material that also has some structural strength e.g. thick rubber. In its equilibrium un-inflated state the lateral balloon is self-supporting and stands upright, proud of the main balloon 116. It is resiliently flexible. Therefore if it is flexed, for example by being bent towards the main balloon (as shown in FIG. 7A) it will return to its upright position when released (as shown in FIG. 7B).

A main air supply 130 is arranged to expand the main balloon 116 by inflation and operable to collapse the main balloon 116 by deflation.

A lateral air supply 132, which is operable independently of the main air supply 130 is arranged to expand the lateral balloon 126 by inflation and operable to deflate the lateral balloon part 120.

The main air supply 130 and the lateral air supply may be separate feeds off a single air supply.

A camera 136 for correctly locating and positioning the packer 100 may be housed within the main part 110 looking through an aperture (not shown).

The process of lining a junction 16 will now be described. This process is applicable whether or not the main pipe 14 and the lateral pipe 12 have previously been lined.

The packer 100 is placed in its starting state. The lateral balloon 126 and the main balloon 116 are deflated.

A lining 20 is impregnated with cure-in-place resin and placed on the packer 100. The main portion 22 of the lining 20 is supported by the main balloon 126 and the lateral portion 24 of the lining 20 is supported by the lateral balloon 116. The resin may be an ambient cure type which cures with the passage of time e.g. epoxy resins or fibreglass type liquid resin. After curing the resin impregnated fabric of the lining will become a structural type plastic and form a 2–4 mm thick liner.

The lateral balloon 125 supporting the lateral lining is bent over to one side towards the surface of the deflated main balloon 116 and secured in position with a band 119.

The packer 100 with lining is manoeuvred into position using the camera as shown in FIG. 7A.

The main part 110 of the packer 100 is expanded by inflating the main balloon 116 supporting the main portion 22 of the lining as shown in FIG. 7B. This pushes the main portion 22 of the lining against the wall of the main pipe 14. The expansion of the main balloon also breaks the band 119 and releases the lateral balloon, which tries to return to is upright position within the lateral line 12.

The lateral balloon 116 is then separately inflated as shown in FIG. 7C. This pushes the lateral lining against the lateral pipe 12 in the vicinity of the junction 16.

The lining is then cured, for example, by the passage of time (a few hours) or by heat. For example, the balloons may be inflated with hot air, steam or water. Then the lateral balloon 116 is deflated. Then the main balloon is deflated and the packer 100 is removed.

The process pushes the lining into the lateral pipe 12. There is no shooting of an inverted lining.

The main lining portion 22 of the lining may be a flat sheet or it may be pre-formed into a tube.

Although the main portion 22 has been described as made of resin-absorbent fabric, it may alternatively be form from a sheet of steel or a ductile but rigid material.

Although the lining 20 has been described as one-piece two-portion, alternative arrangements are possible for use with the packer illustrated in FIGS. 7A–7C. There may be a separate main lining and a separate lateral lining. The separate main lining is supported by the main balloon 116 and the separate lateral lining is supported by the lateral balloon 126. It is also possible to use a lateral lining by itself, without a main lining. The main balloon 116 is inflated to position the lateral balloon 126 which is then inflated to apply the lateral lining to the walls of the lateral pipe 12. The lateral lining may have a brim or flange-like portion at an end that is applied to the wall of the main pipe adjacent the junction where the lateral pipe joins the main pipe.

The main lateral pipe 12 may be lined before the junction 16 is lined as described above. According to one method, a tubular resin-impregnated lateral lining 150 is shot from just short of where the lateral pipe 12 and main pipe 14 meet into the lateral pipe 12. This is achieved using an inverted balloon which is shot from the main pipe 14 into the lateral 12 using fluid pressure. Alternatively, a tubular resin-impregnated lateral lining 150 is shot from a clean-out (man-hole) to just short of where the lateral pipe 12 and main pipe 14 meet. This is achieved using an inverted balloon which is shot into the lateral 12 towards the main pipe 14 using fluid pressure.

Figure 8A:
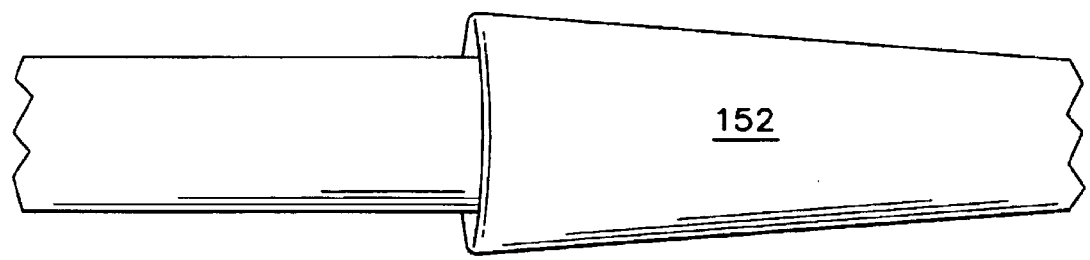
FIGS. 8A and 8B illustrate a balloon folded so that it grips a tubular lining in the fold.
Figure 8B:
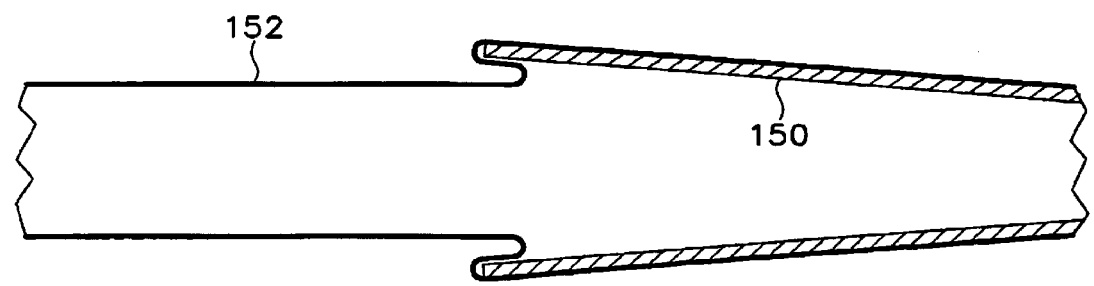

The tubular lining 150 is attached to the balloon 152 by folding forward and then back the inverted balloon lining to form an "S" shape circumferentially around the balloon 152. The edge of the lining is inserted into the upper curve of the "S" shape. The exterior of the balloon when inverted is shown in FIG. 8A and the cross-section through FIG. 8A is shown in FIG. 8B.

Although embodiments of the present invention have been described in the preceding paragraphs with reference to various examples, it should be appreciated that modifications to the examples given can be made without departing from the spirit and scope of the invention.

What is claimed is:

1. An apparatus for lining a junction where a lateral pipe meets a main pipe, comprising:
   a first support body for supporting a main lining, for lining a portion of the main pipe;
   a second support body for supporting a lateral lining, for lining a portion of the lateral pipe;
   a first drive mechanism for moving the first support body so that a supported main lining lines a portion of the wall of the main pipe; and
   a second drive mechanism for moving the second support body so that a supported lateral lining lines a portion of the wall of the lateral pipe.

2. An apparatus as claimed in claim 1, wherein the first support body comprises a first inflatable balloon.

3. An apparatus as claimed in claim 2, wherein the first drive mechanism comprises means for inflating the first inflatable balloon.

4. An apparatus as claimed in claim 3, wherein the second support body is or comprises an inflatable balloon.

5. An apparatus as claimed in claim 4, wherein the second drive mechanism comprises means for inflating the second inflatable balloon, independently of the first balloon.

6. An apparatus as claimed in claim 4, wherein the second support body is resiliently flexible, returning to near a first position when flexed therefrom.

7. An apparatus as claimed in claim 1, wherein the lateral lining and the main lining are connected together.

8. An apparatus as claimed in claim 1, wherein the lateral lining and the main lining are physically distinct and separate.

9. An apparatus as claimed in claim 8, wherein the second support body is less than 24" long.

10. A method of lining a junction where a lateral pipe meets a main pipe, using a mechanism including a first support body that supports a main lining, for lining a portion of the main line, and a second support body that supports a lateral lining, for lining a portion of the lateral line, comprising the steps of:
    moving the first support body so that the main lining lines a portion of the wall of the main pipe; and
    moving the second support body so that the lateral lining lines a portion of the wall of the lateral pipe.

11. A method as claimed in claim 10, wherein the steps of moving the first and second support bodies are independent.

12. A method as claimed in claim 11, wherein the first support body is resiliently expandable and the step of moving the first support body involves expanding the first support body.

13. A method as claimed in claim 12, wherein the first expandable support body is asymmetrically expandable.

14. A method as claimed in claim 13, wherein the second support body is resiliently expandable and the step of moving the second support body involves expanding the second support body.

15. A method as claimed in claim 10, wherein the movement of the first support body caused by the step of moving the first support body, positions the second support body.

16. A method as claimed in claim 10, wherein the main lining is a main portion of a two-portion lining having a main portion for lining a portion of the main pipe and a lateral portion of resin impregnated material for lining a portion of the lateral pipe, and the lateral lining is the lateral portion of the two-portion lining.

17. A method as claimed in claim 16, wherein the main portion is sized for application to the full circumference of a main pipe on both sides of the junction and has an aperture for alignment with the opening of the lateral pipe.

18. A method as claimed in claim 16, wherein the step of moving the second support body extends the lateral portion from a gathered configuration in which it is gathered on the first side of the main portion to a sealing configuration in which the lateral portion extends on the first side of the main portion away from the main portion and terminates at a free-end.

19. A method as claimed in claim 10, wherein moving the first support body brings the main portion into contact with the wall of the main pipe; and separately, moving the second support body brings the lateral portion into contact with the wall of the lateral pipe.

20. A lining for sealing the junction region where a lateral pipe and a main pipe meet, comprising a two-portion structure including a main portion for lining a portion of the main pipe and a lateral portion of resin absorbent material for lining a portion of the lateral pipe, wherein the main portion has a first side for contacting the main pipe, is sized for application to at least a portion of circumference of the main pipe on both sides of the junction and has an aperture for alignment with the opening of the lateral pipe and wherein the lateral portion is in contact with the main portion where it defines said opening and is gathered on the first side of the main portion.

21. A lining as claimed in claim 20, wherein the lateral portion is extendible, during application, from a gathered configuration in which it is gathered on the first side of the main portion to a sealing configuration in which the lateral portion extends on the first side of the main portion away from the main portion and terminates at a free-end.

22. A lining as claimed in claim 21, wherein in the gathered configuration the lateral portion is collapsed and self-overlapping.

23. A lining as claimed in claim 21, wherein in the gathered configuration the lateral portion is compactly folded.

24. A lining as claimed in claim 20, wherein the lateral portion is sized for application to substantially the full circumference of the interior surface of the lateral pipe in the vicinity of the junction.

25. A lining as claimed in claim 24, wherein the lateral portion is substantially tubular in shape.

26. A lining as claimed in claim 24, wherein the lateral portion is a longitudinally shredded tube.

27. A lining as claimed in claim 24, wherein the lateral portion is substantially frusto-conical in shape, having a diameter that reduces in size with distance from the main portion.

28. A lining as claimed in claim 24, wherein the lateral portion has a length, when fully extended that is less than two metres.

29. A lining as claimed in claim 20, wherein the main portion is a flat sheet having a width that is greater than the circumference of the main pipe.

30. A lining as claimed in claim 20, wherein the main portion is sized for application to the full circumference of the main pipe.

31. A lining for sealing the junction region where a lateral pipe and a main pipe meet, comprising a two-portion structure including a main portion for lining a portion of the main pipe and a lateral portion of resin absorbent material for lining a portion of the lateral pipe, wherein the main portion is sized for application to at least a portion of the circumference of a main pipe on both sides of the junction and has an aperture for alignment with the opening of the lateral pipe and wherein the lateral portion has a first end that is connected to the main portion where it defines said opening and a second unconnected end and is of tubular or frusto-conical shape with multiple circumscribing fault lines about which the lateral portion may be multiply folded.

32. A method of sealing the junction region where a lateral pipe and a main pipe meet, using a two-portion lining including a main portion for lining a portion of the main pipe and a lateral portion of resin absorbent material for lining a portion of the lateral pipe, wherein the main portion has a first side for contacting the main pipe, is sized for application to at least a portion of the circumference of the main pipe on both sides of the junction and has an aperture for alignment with the opening of the lateral pipe and wherein the lateral portion is connected to the main portion where it defines said opening comprising the step of:

gathering the lateral portion on the first side of the main portion.

33. A method as claimed in claim 32, wherein the step of gathering the lateral portion is performed by multiply folding the lateral portion.

34. A method as claimed in claim 32, further comprising impregnating the lateral portion with curable resin.

35. A method as claimed in claim 34, wherein the lining is applied to the junction by:

expanding main portion so that it contacts the wall of the main pipe;

extending lateral portion from a gathered configuration in which it is gathered on the first side of the main portion to a sealing configuration in which the lateral portion extends on the first side of the main portion away from the main portion and terminates at a free-end; and expanding the lateral portion so that it contacts the wall of the lateral pipe.

36. A method as claimed in claim 32, wherein the main portion is sized for application to the full circumference of the main pipe.

37. An apparatus for lining a junction where a lateral pipe meets a main pipe, comprising:

a first main balloon;

a second lateral balloon for supporting a lateral lining, for lining a portion of the lateral pipe;

a first mechanism for inflating the first main balloon; and a second mechanism for separately inflating the second lateral balloon so that a supported lateral lining lines a portion of the wall of the lateral pipe.

38. A method of lining a lateral pipe where it meets a main pipe, using a mechanism including a first main balloon and a second lateral balloon that supports a lateral lining, for lining a portion of the lateral line, comprising the steps of:

inflating the first balloon; and separately inflating the second balloon so that the lateral lining lines a portion of the wall of the lateral pipe.

* * * * *